Nov. 10, 1931.  J. S. LOSEE  1,831,499
MILK STIRRING APPARATUS
Filed May 1, 1930   2 Sheets-Sheet 1
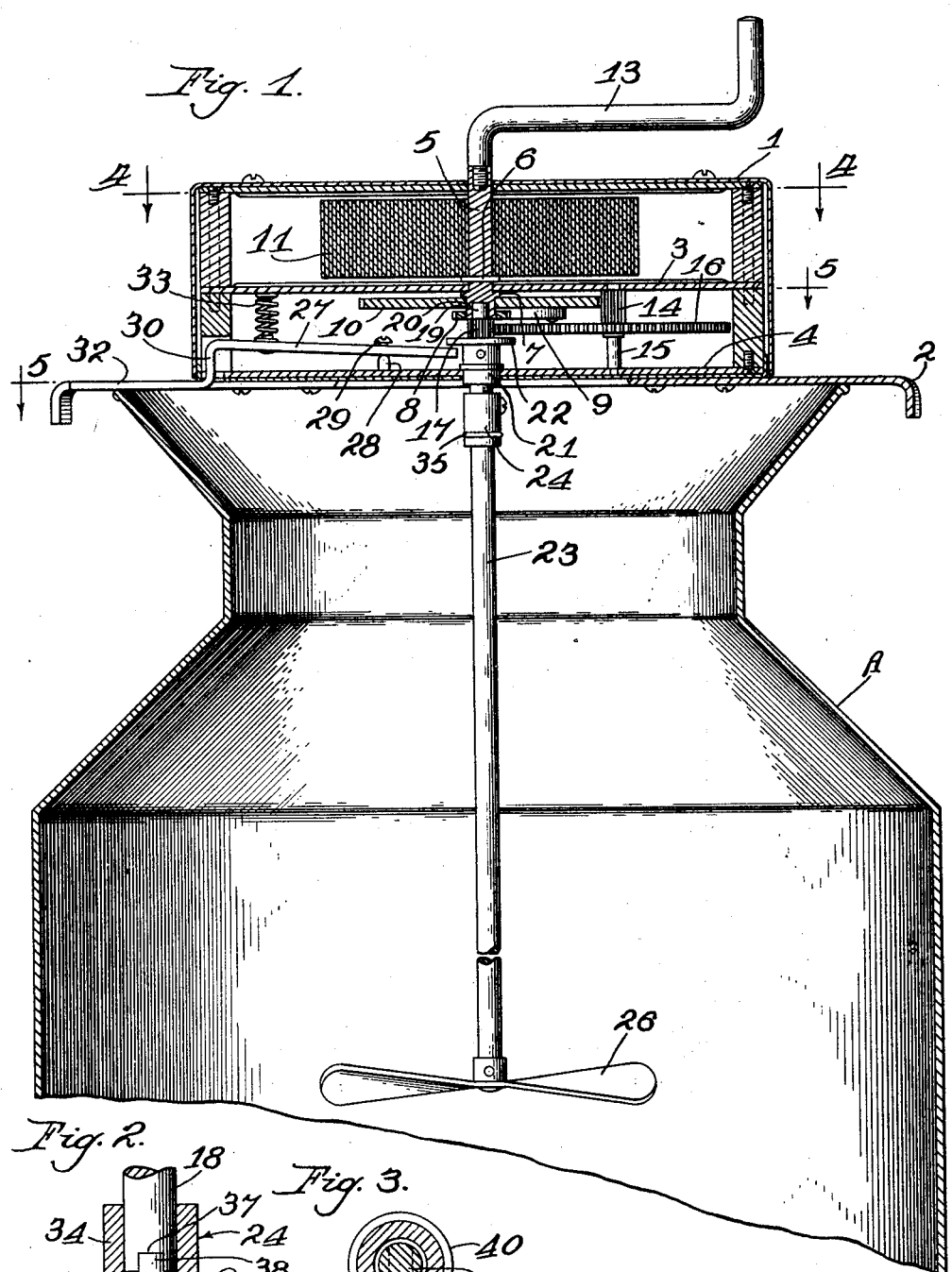
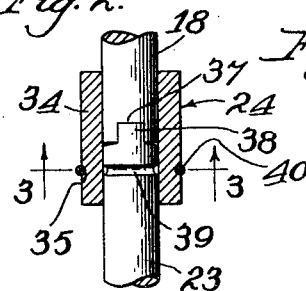
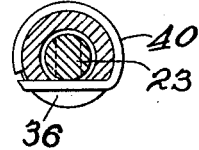
Inventor.
Joseph S. Losee.

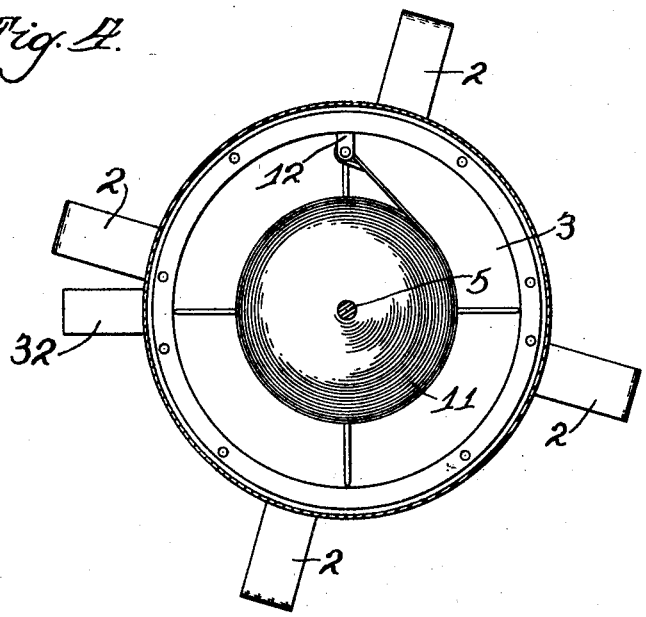
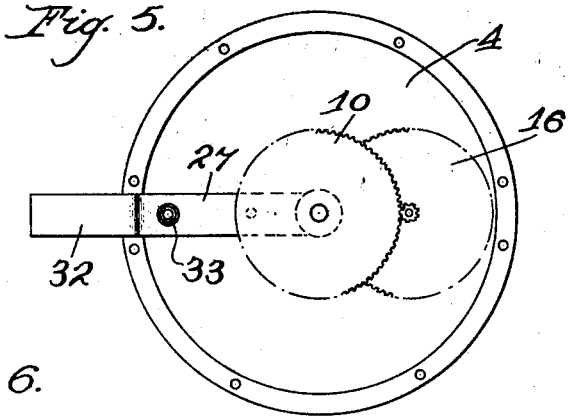
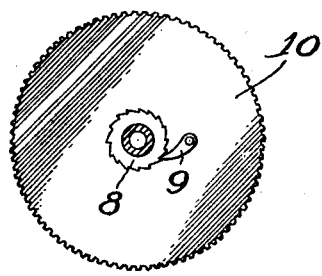

Patented Nov. 10, 1931

1,831,499

UNITED STATES PATENT OFFICE

JOSEPH S. LOSEE, OF HEBRON, ILLINOIS

MILK STIRRING APPARATUS

Application filed May 1, 1930. Serial No. 449,041.

This invention relates to improvements in milk stirring apparatus and is particularly useful in connection with stirring milk while it is cooling in milk cans.

One of the objects of the invention is to provide milk stirring apparatus that may be readily applied to milk cans and without danger of injury to the operator. A further object is to provide brake mechanism in stirring apparatus, which will prevent the operation of the stirrer-actuating mechanism when the apparatus is removed from the top of the liquid container, but which will be released so as to set the mechanism into operation again when the apparatus is again placed upon the liquid container. A still further object is to provide propeller or stirring apparatus which may be readily assembled or disassembled to permit cleaning of the parts. Other objects and advantages will appear as the description proceeds.

The invention is fully described in the following specification and shown in the accompanying drawings in which, Figure 1, is a broken sectional view of my improved stirring apparatus applied to a milk can; Fig. 2 is a broken sectional view of the cylindrical coupling which is used to unite the propeller shaft with the actuating mechanism as shown between the arrows in Fig. 1; Fig. 3 is a sectional view, the section being taken as indicated at line 3 of Fig. 2; Fig. 4 is a sectional view, the section being taken as indicated at line 4 of Fig. 1; Fig. 5, is a sectional view, the section being taken as indicated at line 5 of Fig. 1; and Fig. 6 is a detailed view in elevation of gear and dog mechanism shown in Fig. 1.

In the illustration given, 1 designates a housing, which may be of cylindrical shape and which is provided on its lower side with fingers or brackets 2 adapted to rest upon the top surface or mouth of a container, such as for example, a milk can A. The casing 1 is provided with an intermediate point with a transverse support 3 and near its base with a second transverse support 4.

A handle-equipped shaft 5 extends through the top wall of the casing and is rotatably secured within the transverse wall 3 by a pair of collars 6 and 7 which engage opposite sides of the wall 3.

To the lower end of shaft 5 is fixed a ratchet 8 engaged by pawl 9 mounted upon and movable with a pinion 10. The pinion 10 is loose on the shaft and is supported between collar 7 and ratchet 8. Secured to the shaft 5 and supported upon the wall 3 is a large spring 11 which has its outer end secured to a lug 12, as shown more clearly in Fig. 4. The spring is wound up by turning the shaft through the medium of the handle or crank 13, the ratchet 8 in this operation running past the pawl 9. When pressure on the crank is released, the ratchet 8, pawl 9 and pinion 10 moves together.

The pinion 10 drives another pinion 14 which is rigid upon shaft 15. The shaft 15 is journaled in the intermediate and bottom walls 3 and 4. Also fast upon shaft 15 is a spur gear 16 which drives a pinion 17. The pinion 17 is fixed upon the end of a short shaft 18 which is provided with a round extension 19 that is received within the recess 20 with which the lower end of shaft 5 is provided.

The short shaft 18 carries a sleeve 21 which is fixedly secured thereto by means of a pin. Integrally formed with the sleeve is a relatively large flange or disc 22. The lower end of the shaft 18 is secured to the propeller shaft 23 by means of a cylindrical coupling 24.

In order to prevent the propeller and actuating mechanism from injuring the operator, I provide brake mechanism which serves to lock the moving parts when the apparatus is removed from the liquid container. Such mechanism is automatically released when the apparatus is again placed upon the top of a container. In the lug illustration given, the brake mechanism comprises a long blade or shaft 27 which is pivotally secured upon the element 28. A screw 29 extends through a perforation in lever 27 and into a threaded recess in the lug 28, thus holding the lever in position. The outer end of the lever 27 is stepped down at 30. The end of the lever comprises a horizontal portion 32 which is adapted to rest upon the top of the liquid container. A compression spring 33 is secured between the intermediate wall 3 and the lever 27 and urges the lever in a downward position so as to bring the inner end of the lever against the disc 22. Bolts may be used to secure spring 33 in position upon the wall 3 and lever 27.

As shown more clearly in Figs. 2 and 3, the cylindrical coupling 24 comprises a sleeve member 34 which is equipped with an annular groove 35 and with a slot 36. The lower end of shaft 18 is provided with a recess 37 adapted to receive a squared tongue 38 with which the propeller shaft 23 is equipped. Propeller shaft 23 is also provided with an annular groove 39 in alignment with the groove 35 and slot 36 of the sleeve 34. A D spring 40 is placed around the annular groove 35 so that its straight leg enters the slot 36. As shown more clearly in Fig. 3 the straight leg of the D spring engages the annular groove 39 of the propeller shaft and releasably secures the shaft to the annular sleeve 34 and the shaft 18 to which the sleeve 34 is fixed.

In the operation of the apparatus when the mechanism is removed from the top of the container, the spring 33 exerts a pressure downwardly upon the brake member 27 causing the inner end of the brake to be forced against the disc or flange 22. The spring is wound up by turning the shaft 5 by means of crank 13, the pawl 9 in this operation slipping over the ratchet 12. When the apparatus is set on top of the container, the brake end 32 is raised against the force of the spring 33 and the brake is thus automatically removed and the motor turns the propeller shaft.

When it is desired to remove the propeller shaft for the purpose of cleaning, etc., the shaft may be pulled or jerked to cause the straight leg of the D spring to ride out of the groove 39. To attach the propeller shaft again to the coupling 34, the shaft may be pushed into the coupling and turned until the tongue 38 enters the groove 37. The shaft 23 will then enter the coupling and the D spring 40 will engage groove 39.

While the motor, in the illustration given, comprises a spring mechanism, it is obvious that an electric motor or other means may be substituted therefor.

The apparatus is particularly useful in cooling milk to the temperature required before it is sent to the creameries.

The milk cools down very rapidly when the milk cans are placed in water and the milk is stirred with the mechanism described. It will be observed that by means of the brake mechanism disclosed, the operator can handle the motor and propeller apparatus without danger of injury because the moving parts are not set in operation until after the propeller is in the can and the actuating mechanism rests upon the top of the container. Also, milk is not thrown out of the can when the apparatus is removed or placed in position as would otherwise be the case, if the actuating mechanism were not restrained by the brake.

The coupling member permits the propeller shaft to be readily removed by a direct downward pull. Also, the cylindrical sleeve of the coupling member serves to hold the propeller shaft in alignment with the drive shaft, and thus causes the propeller to exert a direct propelling force upwardly. By this means the milk is forced repeatedly to the surface and rapidly cooled by contact with the air.

The foregoing detailed description has been given for clearness of understanding only, and no unnecessary limitations should be understood therefrom, but the appended claims should be construed as broadly as permissible, in view of the prior art.

I claim:

1. In an apparatus of the character set forth, a casing adapted to engage the top of a liquid container, stirring means carried by the casing, spring-actuated mechanism for the stirring means, and braking means normally restraining said actuating mechanism, said braking means being equipped with extension means adapted to disengage said braking means when the casing is placed upon the top of the container.

2. In apparatus of the character set forth, a casing adapted to be supported upon the top of a liquid container, stirring means carried thereby, spring-actuated mechanism for the stirring means, a brake normally restraining said actuating mechanism, and means co-operating with said brake to release the brake when the apparatus is placed upon said container.

3. In apparatus of the character set forth, a casing adapted to be supported upon the top of a container, stirring means carried by the casing, spring-actuated means for the stirring means, and a spring urged brake normally restraining said mechanism, said brake being equipped with a lever adapted to engage the top of said container and disengage said brake.

4. In apparatus of the character set forth, a casing member equipped with a bracket adapted to rest upon the top of a container, stirring means carried by said casing, speed reduction gears, spring-actuated mechanism for driving said stirring means through said reduction gears, and a spring urged brake normally restraining said stirring means, said brake being equipped with means adapted to engage the top of said container and to disengage said brake.

5. In apparatus of the character set forth, a casing adapted to be supported upon the top of a container, a shaft journalled therein, stirring means supported by said shaft, means for driving said shaft, said shaft being equipped with a flange a brake lever tiltably supported in said casing and having an extension adapted to engage the top of said container, and a spring normally urging said lever so that its inner end engages the flange of said shaft, said brake lever being adapted to be disengaged from said flange when the extension of said lever is brought into engagement with the top of said container.

6. In apparatus of the character set forth, a casing adapted to be supported adjacent the top of a container, stirring means carried by the casing, spring actuated means for the stirring means, a brake normally restraining the actuation of said stirring means, and means associated with said brake adapted to engage the container and to disengage said brake.

In testimony whereof I have hereunto set my hand this 16th day of April, 1930.

JOSEPH S. LOSEE.